No. 742,598. Patented October 27, 1903.

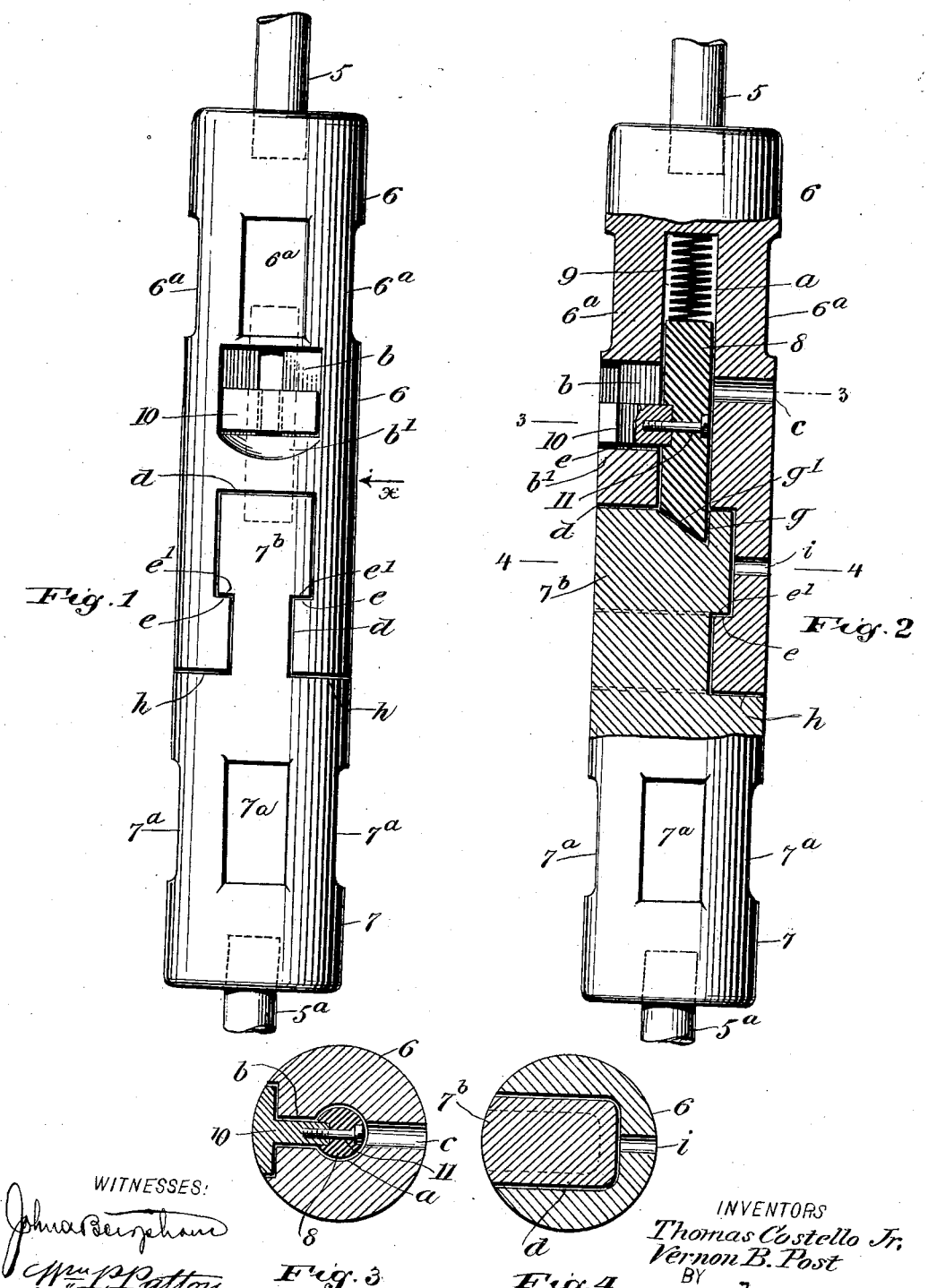

UNITED STATES PATENT OFFICE.

THOMAS COSTELLO, JR., AND VERNON B. POST, OF SPENCERVILLE, OHIO.

AUTOMATIC COUPLING FOR SECTIONAL PUMP-RODS.

SPECIFICATION forming part of Letters Patent No. 742,598, dated October 27, 1903.

Application filed October 24, 1902. Serial No. 128,574. (No model.)

*To all whom it may concern:*

Be it known that we, THOMAS COSTELLO, Jr., and VERNON B. POST, citizens of the United States, and residents of Spencerville, in the county of Allen and State of Ohio, have invented a new and Improved Automatic Coupling for Sectional Pump-Rods, of which the following is a full, clear, and exact description.

This invention relates to means for connecting together the ends of sections of long pump-rods or long rods used for the transmission of power and motion.

In deep oil and water wells that are provided with lifting-pumps it becomes necessary to withdraw the valve-rod at times to free it from obstruction or for the renewal of the sucker-valve. To permit the withdrawal of the valve-rod, it has been customary to form the valve-rod in sections and join said sections by threaded socket-nuts. This construction is inconvenient and very laborious when the sections are successively screwed together while lowering the pump-rod in the well to operate the pump therein, and the same is true with regard to the removal of the pump-rod.

The object of our invention is to provide a sectional pump-rod or other sectional shaft or rod with a simple novel coupling device for joining together the adjacent ends of the rod-sections, which may be automatically connected by laterally pressing together the two complementary portions of said coupling device and be readily disconnected without undue labor, as occasion may require.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a side view of the improved rod-coupling, showing its two members connected and joining together the adjacent ends of sections of a pump-rod. Fig. 2 is a partly-sectional side view of the coupling device seen in the direction of the arrow $x$ in Fig. 1. Fig. 3 is a transverse sectional view substantially on the line 3 3 in Fig. 2, and Fig. 4 is a like view substantially on the line 4 4 in Fig. 2.

In the drawings that show the construction and application of the improvement, 5 and $5^a$ indicate two adjacent end portions of a pump-rod to be connected together, these sections respectively representing the lower end of an upper rod-section and the upper end of a rod-section next in sequence below said upper rod-section. The coupling comprises two body portions 6 and 7, respectively affixed by any suitable means upon the rod-sections 5 $5^a$, so that said body portions will be in axial alinement with each other and with the rod-sections when the parts 6 7 are connected together for service. The body portions 6 7 may be formed cylindrical or four-sided with the corners removed and may with advantage be afforded equal length.

In the body portion or section 6 that is uppermost in service as a pump-rod coupling a longitudinal socket-hole $a$ is axially formed, extending from the normal lower end toward the opposite or upper extremity, whereon the pump-rod section 5 is affixed. A latch-bolt 8 is loosely inserted into the socket-hole $a$ and is seated upon a spring 9, that in turn seats upon the bottom wall of the socket-hole, as shown in Fig. 2.

At one side of the socket-hole $a$ an open recess $b$ is formed, that cuts through the side wall of the socket-hole it intersects, and in this side wall opposite the recess $b$ an orifice $c$ is formed. A pusher-block 10 is located in the recess $b$ and at its inner end is preferably embedded in a depression formed to receive it in the slidable latch-bolt 8, said pusher-block being secured upon the latch-bolt by a screw 11, that may be screwed therein by insertion through the orifice $c$ when the latch-bolt and block are properly positioned in the socket-hole $a$ and recess $b$.

At the lower end on one side of the body-section 6 and with advantage directly below the open recess $b$ an open recess $d$ is formed, said recess being T-shaped, the wider portion of this recess being disposed at the top, thus providing two offset shoulders $e$ $e$ thereon, where the narrower part of the recess merges into the wider portion, as is clearly shown in Fig. 1. The other body portion or section 7 equals in diameter and has a like contour to that of the section 6, and it may here be explained that in case these two parts of the coupling are cylindrical each one is flattened for a portion of its length at opposite points, as at $6^a$ $7^a$, to permit the application thereon of a wrench or a holding-clamp, as may be necessary in handling the sections of the pump-rod upon which the coupling device is affixed.

On the upper end portion of the body-section 7 a T-shaped tongue $7^b$ is formed, which loosely fits into the recess $d$, having offsets $e'$ $e'$ thereon, which will interlock with the shoulders $e$ $e$ when the tongue is fully inserted into the recess. A cupped depression $g$ is formed in the upper end of the tongue $7^b$ at a point which adapts it to receive the lower end of the latch-bolt, and said lower end may be sloped on the bottom, as represented at $g'$ in Fig. 2, so as to adapt the same to be readily entered within said depression when the tongue is inserted into the recess $d$.

It will be seen that the level lower end of the body portion 6 loosely contacts with the shoulders $h$, that are produced at the base of the tongue $7^b$ where it merges into the body-section 7 when the tongue is fully introduced within the recess $d$, so that the two sections 6 7 of the coupling will be coupled together without end play and be held so connected when the tongue on one section is fully inserted into the recess $d$ of the other section, as is clearly shown in Figs. 1 and 2 of the drawings.

To facilitate the removal of dirt that may enter the recess $d$, a perforation $i$ is formed in the rear wall of said recess, which permits the fluid accumulation to be pressed out, and thus enable the free introduction of the tongue.

In detaching the coupled sections 6 7 it is only necessary to manipulate the pusher-block 10 so as to slide it upwardly, and thus remove the lower end of the latch-bolt 8 from the cupped depression $g$, whereupon the coupling-section 7 may be moved laterally, and thus detach the tongue $7^b$ from the recess $d$. To enable the manipulation of the pusher-block 10 to be freely effected, a scallop $b'$ may be formed at the base of the recess $b$, which will admit the thumb of the operator, and thus give access to the lower end of the pusher-block for its upward movement and the consequent release of the latch-bolt 8.

Having thus described our invention, we claim as new and desire to secure by Letters Patent—

1. A rod-coupling comprising two body-sections adapted to be connected, one of said sections having a socket therein, means carried by the other section and fitting in said socket for preventing the longitudinal movement of the sections relative to each other when the sections are connected, and spring-tensioned means engaging with the means fitting into the socket, for retaining the sections against lateral movement relative to each other, substantially as set forth.

2. A coupling comprising two sections, one of said sections being provided with a socket, a head formed on the opposite section and adapted to be seated in said socket in such manner that longitudinal movement of the parts relative to each other is prevented, and spring-tensioned means sliding in the socketed portion and preventing the parts being separated by lateral movement, substantially as set forth.

3. A coupling comprising two sections one of said sections being provided with a socket, the other section having a head fitting into said socket, the construction being such that the longitudinal movement of the sections relative to each other is prevented, slidable spring-tensioned means mounted in the socketed section and normally pressed into engagement with the head of the opposite section, whereby the separation of the sections by lateral movement is prevented, and means for pressing the slidable spring-tensioned means out of engagement with the head portion, whereby the parts may be separated, substantially as set forth.

4. A coupling comprising two body-sections, one of said sections having a socket formed therein, a head formed on the opposite section adapted to fit in said socket, said head having a recess formed therein, and spring-tensioned means normally seated in said recess when the parts are connected, whereby the separation of the sections is prevented, substantially as set forth.

5. A rod-coupling, comprising two body-sections, a T-headed tongue on one of said sections, the other section having a corresponding recess, a latch-bolt reciprocal in one of said sections and spring-pressed toward the other section, the tongue having a cupped depression in its free end for the reception of the latch-bolt, and means for retracting said latch-bolt.

6. A rod-coupling, comprising two body-sections, a T-headed tongue on one of said sections, the other section having a corresponding recess wherein the tongue may be laterally slid, said latter section being also provided with an open recess, a latch-bolt slidable axially in the section having the recess, said T-headed tongue having a cupped depression in its head for the reception of the latch-bolt, a spring pressing the latch-bolt, and a pusher-block on the latch-bolt, held to slide in the open recess in the body portion carrying said latch-bolt.

7. A coupling comprising two body-sections, one section having a socket formed therein, means carried by the other section adapted to lie in said socket and prevent the longitudinal movements of the sections relatively to each other when said sections are connected, and slidably-mounted means adapted to engage the means lying in the socket, the construction being such that the sections will be retained against lateral movement relatively to each other.

In testimony whereof we have signed our names to this specification in the presence of two subscribing witnesses.

THOMAS COSTELLO, JR.
VERNON B. POST.

Witnesses:
R. R. KENNEDY,
HILA PATRICK.